United States Patent [19]

Mass et al.

[11] 4,364,980
[45] Dec. 21, 1982

[54] HOLLOW BODY SUITABLE FOR RECEIVING DIFFUSIBLE SUBSTANCES, COATED WITH RESIN VARNISH, AND A PROCESS FOR ITS PRODUCTION AND ITS USE

[75] Inventors: Manfred Mass, Wuppertal; Günter Walter, Metzingen, both of Fed. Rep. of Germany

[73] Assignees: Daimler-Benz AG, Stuttgart; Herberts GmbH, Wuppertal, both of Fed. Rep. of Germany

[21] Appl. No.: 242,654

[22] Filed: Mar. 11, 1981

[30] Foreign Application Priority Data

Mar. 12, 1980 [DE] Fed. Rep. of Germany ....... 3009412

[51] Int. Cl.³ .................. B24B 1/00; B32B 31/00; B05D 3/00
[52] U.S. Cl. ............................. 428/35; 51/317; 51/319; 156/153; 156/668; 427/307; 427/322; 428/36; 428/142; 428/424.8
[58] Field of Search ............... 156/153, 668; 427/307, 427/322; 428/142, 424.8, 35, 36; 51/411, 317, 319

[56] References Cited

U.S. PATENT DOCUMENTS

| 3,023,126 | 2/1962 | Underwood et al. | 428/424.8 |
|---|---|---|---|
| 3,198,692 | 8/1965 | Bridgeford | 428/424.8 |
| 3,306,791 | 2/1967 | Nye | 427/322 |
| 3,440,082 | 4/1969 | Kube | 51/319 |
| 3,616,957 | 10/1971 | Walles | 427/341 |
| 3,726,825 | 4/1973 | Woodward et al. | 428/424.8 |
| 3,740,258 | 6/1973 | Walles | 428/500 |
| 4,021,405 | 5/1977 | Tucker et al. | 428/424.8 |

FOREIGN PATENT DOCUMENTS 1779896 4/1964 Fed. Rep. of Germany .
2236564 2/1974 Fed. Rep. of Germany .

OTHER PUBLICATIONS

"Zorll Chemische und mechanische Haftverbindungen bei Polymeren".
VII, Kunstoff-Handbuch, "Polyurethane".
"Adhäsion", 1979, pp. 18-22, Einige Erkenntnisse auf dem Gebiet . . . .

Primary Examiner—William R. Dixon, Jr.
Attorney, Agent, or Firm—Mandeville and Schweitzer

[57] ABSTRACT

The invention comprises a hollow body, suitable for receiving diffusible substances and made of plastics material coated with varnish resins, the external surface of which has a roughness, measured in profile according to DIN 4768, Part I, of $Rz=$ from 2 to 150 $\mu$m and $R_{max}=$ from 5 to 250 $\mu$m on which a coating, positively linked with that surface to provide a seal against diffusion of liquids and gases present in the body, consisting of a chemically crosslinked polyurethane resin is located in a layer thickness of from 10 to 800 $\mu$m.

13 Claims, No Drawings

HOLLOW BODY SUITABLE FOR RECEIVING DIFFUSIBLE SUBSTANCES, COATED WITH RESIN VARNISH, AND A PROCESS FOR ITS PRODUCTION AND ITS USE

The invention relates to a hollow body, suitable for receiving diffusible substances, particularly a container made of a difficult to coat plastics material such as polyolefin plastics material, coated with varnish resins.

Hollow bodies within the meaning of the invention are containers as well as pipelines, which are suitable for receiving and transporting liquid and gaseous substances. Transport may be effected with the medium at rest in containers, with the medium in motion, and also in pipelines.

Diffusible substances within the meaning of the invention are liquids as well as gases. Solids having components, which have a high vapour pressure, are also included. The term diffusible signifies the capacity of the substances to penetrate the walls of containers and pipelines by virtue of their vapour pressure and their molecular size. The extent of diffusion depends on the properties of the diffusing substance and also on the nature of the wall material, i.e. on the chemical interaction between wall material and diffusing substance.

A material frequently used for receiving and transporting liquid substances, in particular, is polyolefin plastics. Particularly polyethylene is often employed, owing to its favourable price and its low weight. However, polyethylene proves to be unsuitable for receiving diffusible substances such as, for example, internal combustion motor fuel. Especially at elevated ambient temperatures, considerable diffusion losses occur, which become noticeable by unpleasant odour and are also serious on safety grounds. For this reason, mainly fuel containers made of metallic materials, which are diffusion-proof, are currently employed in motor vehicles. However, they have the disadvantage of higher weight and more difficult mode of production and are more susceptible to corrosion. On the other hand, even intricate shapes can be easily formed by the blow-moulding method from plastics materials, so that containers can be produced which are capable of filling in and thus utilising hitherto unused dead angles in the motor vehicles. This was the origin of the problem of sealing hollow bodies, particularly containers made of polyolefin plastics, particularly of polyethylene, against diffusion. Reports have already been made on experiments for solving this problem. Thus U.S. Pat. No. 3,613,957 describes a plastics container, in which at least the internal surface has been sulphonated and neutralised. In this way, hydrogen atoms of the plastics lattice are exchanged in the surface for sulphonic acid groups or sulphonate groups, so that it contains from about 0.001 to about 5.0 mg of sulphonic acid groups per $cm^2$.

Furthermore, West German Auslegeschrift (Examined Patent Application) 24 01 948 describes a process for the production of hollow bodies from thermoplastic synthetic material by blow-moulding, in which a blowing gas, containing from 0.1 to 1.0 molecular percent of fluorine, is used.

The methods of treatment described above achieve sealing of the containers against escape by diffusion of materials present in the containers. However, the methods of treatment described use media that are difficult to handle or even damaging to health, so that these processes, in practice, require considerable expenditure for safety and equipment.

According to the invention, a container made of plastics coated with varnish resins is employed for the solution of the problem indicated. The plastics materials used for containers of this kind such as polyolefin, especially polyethylene, can be coated with varnish resins only with difficulty since the latter do not adhere to the surface. A plastics container is therefore used, according to the invention, which possesses an external surface having a roughness of $R_z$=from 2 to 150 μm and $R_{max}$=from 5 to 250 μm, measured in profile according to DIN (German Standard) 4768, Part 1, on which a coating, positively linking with that surface to provide a seal against diffusion of liquids and gases present in the container, and consisting of a chemically crosslinked polyurethane resin, is located in a layer thickness of from 10 to 800 μm.

In the method for measuring the roughness of a surface according to DIN 4768, Part 1, the surface to be measured is mechanically scanned and the following are reported, inter alia, as the result:

the averaged roughness depth $R_z$, —mean value of the single roughness depths of five successive single distances measured, the single roughness depth being the vertical distance between the highest and lowest points of the roughness profile within a single distance measured;

the maximum roughness depth $R_{max}$, —the greatest single roughness depth existing over the total distance measured.

The external surface of the container can be roughened by a chemical and by a mechanical method. A lower roughness is achieved with chemical roughening; however, the coat of varnish resin applied similarly needs to possess only a low layer thickness.

According to the invention, the plastics hollow body, in one embodiment, possesses a chemically roughened external surface having a roughness of $R_z$=from 2 to 50 μm and $R_{max}$=from 5 to 100 μm, preferably of $R_z$=from 5 to 10 μm and $R_{max}$=from 10 to 50 μm, on which a coating, positively locking with that surface and having a layer thickness of from 10 to 800 μm, preferably from 40 to 80 μm, is located.

With mechanical roughening of the external surface of the container, no wear of material occurs but, as a result of the impact strength of the material, only crater formation. The degree of roughness depends on the blasting means employed for roughening, and on the jet pressure used. Greater roughness results in better adhesion of the varnish resin coating to the surface, but requires a greater layer thickness of the varnish resin for its coverage.

In another preferred embodiment, therefore, the hollow body according to the invention possesses a mechanically roughened external surface having a roughness of $R_z$=from 10 to 150 μm and $R_{max}$=from 100 to 250 μm, preferably of $R_z$=from 40 to 100 μm and $R_{max}$=from 100 to 150 μm, on which a coating positively linking with that surface is located in a layer thickness of from 60 to 800 μm, preferably from 80 to 100 μm.

The coating of surfaces roughened in this way consists, according to the invention, of a chemically crosslinked polyurethane resin obtained by the reaction of (a) an at least difunctional linear or branched polyol, having an average molecular weight of from 400 to 4000, preferably from 500 to 2500, and a hydroxyl group content in the molecule of from 3 to 12% by weight, preferably from 4 to 9% by weight, and (b) an at least difunctional polyisocyanate, having a NCO-content, related to the non-volatile portion, of from 3 to 30% by weight, preferably from 15 to 25% by weight, in a stoichiometric ratio, roughly corresponding to urethane formation.

Preferably, the component (a) consists of an at least difunctional linear or branched aromatic and/or aliphatic polyester-polyol, polyether, polyester-polyether or polyester-polyurethane-polyol and the component (b) of an at least difunctional aliphatic and/or aromatic, cycloaliphatic polyisocyanate or NCO-functional polyurethane pre-adduct.

It may be useful to employ inert solvents for processing the mixture of the compounds (a) and (b).

The stoichiometric ratio of the components, corresponding to urethane formation, usually lies between 70 and 30% by weight of component (a) and between 30 and 70% by weight of component (b). When using NCO-functional polyurethane pre-adducts, however, only a lower quantity of polyol is to be employed, roughly corresponding to a weight ratio of from 99 to 70% of pre-adduct to from 1 to 30% of polyol. A slight excess of component (a) or (b), with respect to the stoichiometric ratio, does not produce any adverse results.

The hollow bodies according to the invention, described above, suitable for receiving diffusible substances, particularly containers made of plastics material such as polyolefin plastics material coated with varnish resins, whilst being difficult to coat, can be produced by the following process:

The external surface of the plastics hollow body is roughened by chemical or mechanical treatment to a roughness, measured in profile, of $Rz=$ from 2 to 150 $\mu$m and $R_{max}=$ from 5 to 250 $\mu$m and subsequently coated with a varnish, based on a chemically crosslinkable two-component polyurethane resin, in a layer thickness of from 10 to 800 $\mu$m and dried at temperatures of between 20° and 80° C.

For chemical roughening, the external surface of the plastics hollow body is roughened by treatment with a concentrated sulphuric acid, containing 5% by weight of alkali metal dichromate in solution, at a temperature of from 40° to 70° C. to a roughness of $Rz=$ from 2 to 50 $\mu$m and $R_{max}=$ from 5 to 100 $\mu$m, preferably of $Rz=$ from 5 to 10 $\mu$m and $R_{max}=$ from 10 to 50 $\mu$m, and subsequently coated with a varnish, based on a chemically crosslinkable two-component polyurethane resin, in a layer thickness of from 10 to 800 $\mu$m, preferably from 40 to 80 $\mu$m.

In mechanical roughening, the external surface of the plastics hollow body is roughened by blasting with granular blasting means to a roughness of $Rz=$ from 100 to 150 $\mu$m and $R_{max}=$ from 100 to 250 $\mu$m, preferably of $Rz=$ from 40 to 100 $\mu$m and $R_{max}=$ from 100 to 150 $\mu$m, and subsequently coated with a varnish, based on a chemically cross-linkable two-component polyurethane resin, in a layer thickness of from 60 to 800 $\mu$m, preferably from 80 to 100 $\mu$m.

A varnish is used for coating, which contains (a) an at least difunctional linear or branched polyol, having an average molecular weight of from 400 to 4000, preferably from 500 to 2500, and a hydroxyl group content in the molecule of from 3 to 12% by weight, preferably from 4 to 9% by weight;

(b) an at least difunctional polyisocyanate, having a NCO-content, related to the non-volatile portion, of from 3 to 30% by weight, preferably from 15 to 25% by weight; and (c) optionally, inert solvents, the components (a) and (b) being employed in a stoichiometric ratio, roughly corresponding to urethane formation. Preferably components (a) and (b) are of the type defined above.

The stoichiometric ratio, corresponding to urethane formation, usually lies at a weight ratio of from 70 to 30% by weight of component (a) and from 30 to 70% by weight of component (b). When using NCO-functional polyurethane pre-adducts, however, the proportion of polyol to be added is smaller, so that a weight ratio of from 99 to 70% by weight of pre-adduct and from 1 to 30% by weight of polyol is usually applied.

It may be useful for application to add inert solvents to the components (a) and (b), their proportion possibly being up to 50% by weight of the workable mixture.

Coating can be effected by customary methods, preferably by spraying.

The coating may consist of one varnish layer or, especially if greater layer thicknesses are desired, of several varnish layers. In that case, the following varnish layer may be applied only after complete drying of the preceding layer; at times, however, it is also advantageous to apply the following varnish layer, before the preceding varnish layer has entirely finished the reaction. Moreover, it may also be of advantage to apply as the first coat a coat of varnish that adheres particularly well to the container material and subsequently to apply, in addition, at least one further varnish layer that adheres well to the first varnish layer and is particularly diffusion-proof.

Drying of the ready-coated container can be effected at temperatures of between 20° and 80° C., i.e. under ordinary conditions as well as at elevated temperatures in a drying device.

The drying process comprises evaporation of any added inert solvent as well as chemical crosslinking of the polyol component and of the polyiso-cyanate component.

The hollow bodies according to the invention, particularly containers, are suited to receiving diffusible substances for the purpose of storage or transport in the form of containers and pipelines. In particular, they are suitable as containers and pipelines for the storage and transport of internal combustion engine fuel.

The hollow bodies according to the invention show the following advantages when used as containers for internal combustion motor fuel: While in the case of containers, the external surface of which had not been roughened before coating with a varnish resin layer, the varnish resin layer is detached from the plastics surface under the influence of fuel escaping by diffusion, the synthetic resin layer in the containers according to the invention remains firmly adhered, even during prolonged storage at 40° C.

While in the case of containers coated without pre-treatment, a distinct odour of fuel is perceptible on the external surface, even on storage at ordinary temperature, the containers according to the invention do not show any discernible odour of fuel, even after prolonged storage at a temperature of 40° C.

A container, varnished without pre-treatment, shows a loss in weight of 50% by weight after three months' temperature treatment at 40° C. By way of contrast, a container according to the invention, having a mechanically roughened external surface, shows with identical treatment a loss in weight of 3% by weight and a container according to the invention, having a chemically roughened external surface, in fact, only a loss in weight of 1.5% by weight.

The following data mat be ascertained from the example data of the state of the art cited, but they are not entirely comparable, owing to the differing treatment temperatures:

| | |
|---|---|
| West German Auslegeschrift 24 01 948 (38° C.) | 7% by weight |
| U.S. Pat. Specification 3 613 957 (23° C.) | 1% by weight |
| U.S. Pat. Specification 3 740 258 (ordinary temperature) | 0.3% by weight |

The comparison shows, with allowance being made for the differing treatment, that the hollow bodies according to the invention are at least equivalent to the state of the art, if, in fact, they do not possess superior diffusion-tightness.

Diffusion measurements according to the specification "Evaporation emission test", paragraph 86. 107-78, U.S.A. Federal Register B show that fuel diffusion in the case of containers according to the invention is only half as large as in the case of untreated plastics containers and is approximately equal to that with polyethylene containers, which had been submitted to internal treatment by sulphonation or fluorination according to the state of the art.

Owing to the properties of the polyurethane resins to be used according to the invention, the diffusion-tightness of the containers according to the invention is maintained, even under the conditions of thermal and mechanical wear, customary in practice, particularly also after impact action.

It is surprising that diffusion—tightness of this order is achieved with the coating materials described according to the invention. Coatings comprising two-component epoxy resins, which are also proof against motor fuel per se, in fact proved to be useless because, especially after temperature treatment at 40° C., embrittlement, cracks and blisters appeared, which led to detachment of the coating from the plastics container and to loss of tightness.

The nature of the invention shall be illustrated by the following examples, without limiting it to them in detail.

EXAMPLE 1

A pipeline, made of polyethylene plastics, of 4 m length, 40 mm internal width and 4 mm wall thickness was roughened by blasting with a granular blasting agent, (corundum, from 0.2 to 2 mm), to a roughness, measured in profile, of $Rz=80$ μm and $R_{max}=100$ μm.

Subsequently, a coat of 100 μm thickness of a varnish, consisting of the following components, was applied by spraying:
- 33.3 parts aromatic polyether polyol, having an average molecular weight of 3750 and an OH-content of 6.8% by weight (commerical product ®Epikote 1009 of Shell AG)
- 25.0 parts aliphatic polyisocyanate, having a NCO-content of 22% by weight (commercial product ®Desmodur N of Bayer AG)
- 33.3 parts methyl glycol acetate
- 4.2 parts ethyl glycol acetate
- 4.2 parts xylene The coating was allowed to dry for 24 hours at ambient temperature.

EXAMPLE 2

A pipeline, made of polypropylene plastics and having several bends, of about 1 m length, 8 mm internal width and 1 mm wall thickness, was treated for 5 minutes in a bath of concentrated sulphuric acid, containing 5% by weight of alkali metal dichromate in solution, at a temperature of 60° C., subsequently rinsed with water and allowed to dry in air. The roughness was $Rz=8$ μm and $R_{max}=12$ μm.

A coating of 40 μm thickness of a varnish, consisting of the following components, was then applied by spraying:
- 21.1 parts araliphatic polyester polyol, having an average molecular weight of about 800 and an OH-content of 8.8% by weight (commercial product ®Desmophen 800 of Bayer AG)
- 14.1 parts araliphatic polyester polyol, having an average molecular weight of about 400 and an OH-content of 6.5% by weight (commercial product ®Desmophen 1100 of Bayer AG)
- 39.1 parts aromatic polyisocyanate, having a NCO-content of 17.3% by weight (commercial product ®Desmodur L of Bayer AG)
- 12.6 parts ethyl glycol acetate
- 13.1 parts ethyl acetate The coating was dried for 45 minutes at 80° C.

EXAMPLE 3

A container of 5 liter capacity, made of polyethylene/polypropylene, having a wall thickness of 2 mm, was roughened by blasting with a granular blasting agent (from 0.2 to 2 mm) to a surface roughness of $Rz=$ from 40 to 100 μm and $R_{max}=150$ μm.

Subsequently, a coating of 100 μm thickness of a varnish, consisting of the following components, was applied by spraying:
- 31.3 parts araliphatic polyester polyol, having an average molecular weight of about 700 and an OH-content of 8% by weight (commercial product ®Desmophen of Bayer AG)
- 28.0 parts aliphatic polyisocyanate, having a NCO-content of 22% by weight (commercial product ®Desmodur N of Bayer AG)
- 36.0 parts ethyl glycol acetate
- 4.7 parts xylene The coating was dried for 45 minutes at 80° C.

EXAMPLE 4

A container of 60 liter capacity, made of polyethylene plastics, having a wall thickness of 3 mm, was roughened by blasting with a granular blasting agent (from 0.2 to 2 mm) to a surface roughness of $Rz=$ from 40 to 100 μm and $R_{max}=250$ μm.

Subsequently, a coating of 200 μm of a varnish of the following composition was applied by spraying:
- 48.8 parts by weight aliphatic polyether polyol, having an average molecular weight of about 500 and an OH-content of 11.5% by weight (commercial product ®Desmophen 550 U)
- 46.3 parts by weight aromatic diisocyanate, having a NCO-content of 30% by weight (commercial product ®Desmodur VL)
- 4.9 parts by weight ethyl glycol acetate The coating was dried for 60 minutes at 75° C.

EXAMPLE 5

A container of 500 ml capacity and a wall thickness of 1 mm, made of polyethylene plastics, was roughened by blasting with a granular material to a surface roughness of $Rz = 50$ μm and $R_{max} = 100$ μm.

Subsequently, a coating of about 60 μm thickness of a varnish, consisting of the following components, was applied by brush application:

80.2 parts by weight NCO-functional polyurethane pre-adduct, having an average molecular weight of about 2000 and a NCO-content of 3.5% by weight (commercial product ®Desmodur E 14 of Bayer AG)

9.9 parts by weight aliphatic polyether polyol, having an average molecular weight of about 500 and an OH-content of 11.5% by weight (commercial product ®Desmophen 550 U of Bayer AG)

9.9 parts by weight ethyl glycol acetate

The coating was dried for 1 hour at 70° C.

EXAMPLE 6

As in Example 4, a container of 60 liter capacity was pre-treated and coated by triple spraying with a varnish of the composition given there. In this case, a coating of 200 μm each was applied and subsequently dried for 60 minutes at 75° C. The total layer thickness of the varnish applied was about 600 μm. A varnish film of that thickness also stood up to long term temperature treatment at 45° C. and thermal and mechanical influences, customary in practice, without loss in diffusion-proof properties.

I claim:

1. Hollow body, suitable for receiving diffusible substances and made of substantially non-elastomeric plastics material coated with varnish resins, characterized in that said body possesses an external surface having a roughness obtained by blasting with a granular blasting agent, measured in profile according to DIN 4768, Part 1, of $Rz = $ from 10 to 150 μm, and $R_{max} = $ from 100 to 250 μm on which a coating, positively linking with that surface and providing a seal against diffusion of liquids and gases present in the body, consisting of a chemically crosslinked polyurethane resin is located in a layer thickness of from 60 to 800 μm.

2. Hollow body according to claim 1, characterised in that it possesses a mechanically roughened external surface, having a roughness of $Rz = $ from 10 to 150 μm and $R_{max} = $ from 100 to 250 μm, on which a coating, positively linking with that surface is located in a layer thickness of from 80 to 100 μm.

3. Hollow body according to claim 1, characterised in that its coating consists of a chemically crosslinked polyurethane resin, obtained by the reaction of
    (a) an at least difunctional linear or branched polyol, having an average molecular weight of from 400 to 4000, and a hydroxyl group content in the molecule of from 3 to 12% by weight, and
    (b) an at least difunctional polyisocyanate, having a NCO-content, related to the non-volatile portion, of from 3 to 30% by weight,
in a stoichiometric ratio, roughly corresponding to urethane formation.

4. Hollow body according to claim 3, characterised in that its chemically crosslinked polyurethane resin has been obtained from the reaction of
    (a) an at least difunctional linear or branched aromatic and/or aliphatic polyester-polyol, polyether, polyester-polyether or polyester-polyurethane-polyol, and
    (b) an at least difunctional aliphatic and/or aromatic cyclo-aliphatic polyisocyanate or NCO-functional polyurethane pre-adduct,
optionally with addition of inert solvents.

5. Use of hollow bodies according to claims 1, 2, 3 or 4 as containers and pipelines for internal combustion engine fuel.

6. Hollow body according to claims 1 or 3, wherein the plastics material is a polyolefin.

7. Hollow body according to claim 6, wherein said plastics material is polyethylene.

8. Process for the production of a hollow body according to claim 1, characterised in that the external surface of the plastics hollow body is roughened to a roughness, measured in profile,
of $Rz = $ from 10 to 150 μm
and $R_{max} = $ from 100 to 250 μm
and, subsequently, coated with a varnish, based on a chemically crosslinkable two-component polyurethane resin, in a layer thickness of from 60 to 800 μm, and dried at temperatures of between 20° and 80° C.

9. Process according to claim 8 or 5, characterised in that a varnish, consisting of the components indicated in the following, is used for coating:
    (a) an at least difunctional linear or branched polyol, having an average molecular weight of from 400 to 4000, and a hydroxyl group content in the molecule of from 3 to 12% by weight, and
    (b) an at least difunctional polyisocyanate, having a NCO-content, related to the non-volatile portion, of from 3 to 30% by weight, and
    (c) optionally inert solvents,
the components (a) and (b) being employed in a stoichiometric ratio roughly corresponding to urethane formation.

10. Process according to claim 9, characterised in that the component (a) used is an at least difunctional linear or branched aromatic and/or aliphatic polyester-polyol, polyether, polyester-polyether or polyester-polyurethane-polyol and the component (b) used is an at least difunctional aliphatic and/or aromatic cycloaliphatic polyisocyanate or NCO-functinal polyurethane pre-adduct.

11. Process according to claim 8, characterised in that the external surface of the plastics hollow body is roughened by blasting with a granular blasting agent to a roughness
of $Rz = $ from 10 to 150 μm
and $R_{max} = $ from 100 to 250 μm
and, subsequently, coated with a varnish, based on a chemically crosslinkable two-component polyurethane resin, in a layer thickness of from 80 to 100 μm.

12. Process according to claim 11, wherein said plastics material is a polyolefin.

13. Process according to claim 11, wherein said plastics material is polyethylene.

* * * * *